United States Patent
Wauke (12) 
(10) Patent No.: US 6,741,419 B2
(45) Date of Patent: May 25, 2004

(54) DISK ROTATION DRIVING APPARATUS IN WHICH A DISK-LIKE RECORDING MEDIUM IS CENTERED ON A TURN TABLE

(75) Inventor: Tomokuni Wauke, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 106 days.

(21) Appl. No.: 10/217,077

(22) Filed: Aug. 12, 2002

(65) Prior Publication Data

US 2003/0035244 A1 Feb. 20, 2003

(30) Foreign Application Priority Data

Aug. 15, 2001 (JP) ........................................ 2001-246352

(51) Int. Cl.[7] .............................................. G11B 5/016
(52) U.S. Cl. ..................................................... 360/99.05
(58) Field of Search ............................. 360/99.04, 99.05

(56) References Cited

U.S. PATENT DOCUMENTS 5,126,900 A * 6/1992 Munekata ................. 360/99.12
5,151,836 A * 9/1992 Ichihara ................... 360/99.08
5,701,217 A   12/1997 Yokouchi
6,208,487 B1   3/2001 Furuki

FOREIGN PATENT DOCUMENTS

EP    1 061 512    12/2000

* cited by examiner

*Primary Examiner*—A. J. Heinz
(74) *Attorney, Agent, or Firm*—Brinks Hofer Gilson & Lione (57) ABSTRACT

A base of an arm having a driving projection at its tip is rotatably supported on a turn table. The turn table is provided with a first guide part and a second guide part, an outer edge part of the base of the arm and a first guide part are in contact with each other at a contact point, and a projection and a second guide part are in contact with each other at a contact point. While the arm rotates in a counterclockwise direction, the contact points are moved, and it is possible to prevent the center of the driving projection from largely deviating from a reference normal. Thus, even if a hub in which the position of the driving hole is shifted is mounted, the hub is not largely shifted in a rotation direction relative to a turn table.

5 Claims, 6 Drawing Sheets

DISK ROTATION DRIVING APPARATUS IN WHICH A DISK-LIKE RECORDING MEDIUM IS CENTERED ON A TURN TABLE

BACKGROUND OF THE INVENTION

1. Field of the Invention

The present invention relates to a disk rotation driving apparatus in which a hub provided at the center of a disk-like recording medium, such as a floppy disk, is centered on a turn table.

2. Description of the Related Art

Figure 7:
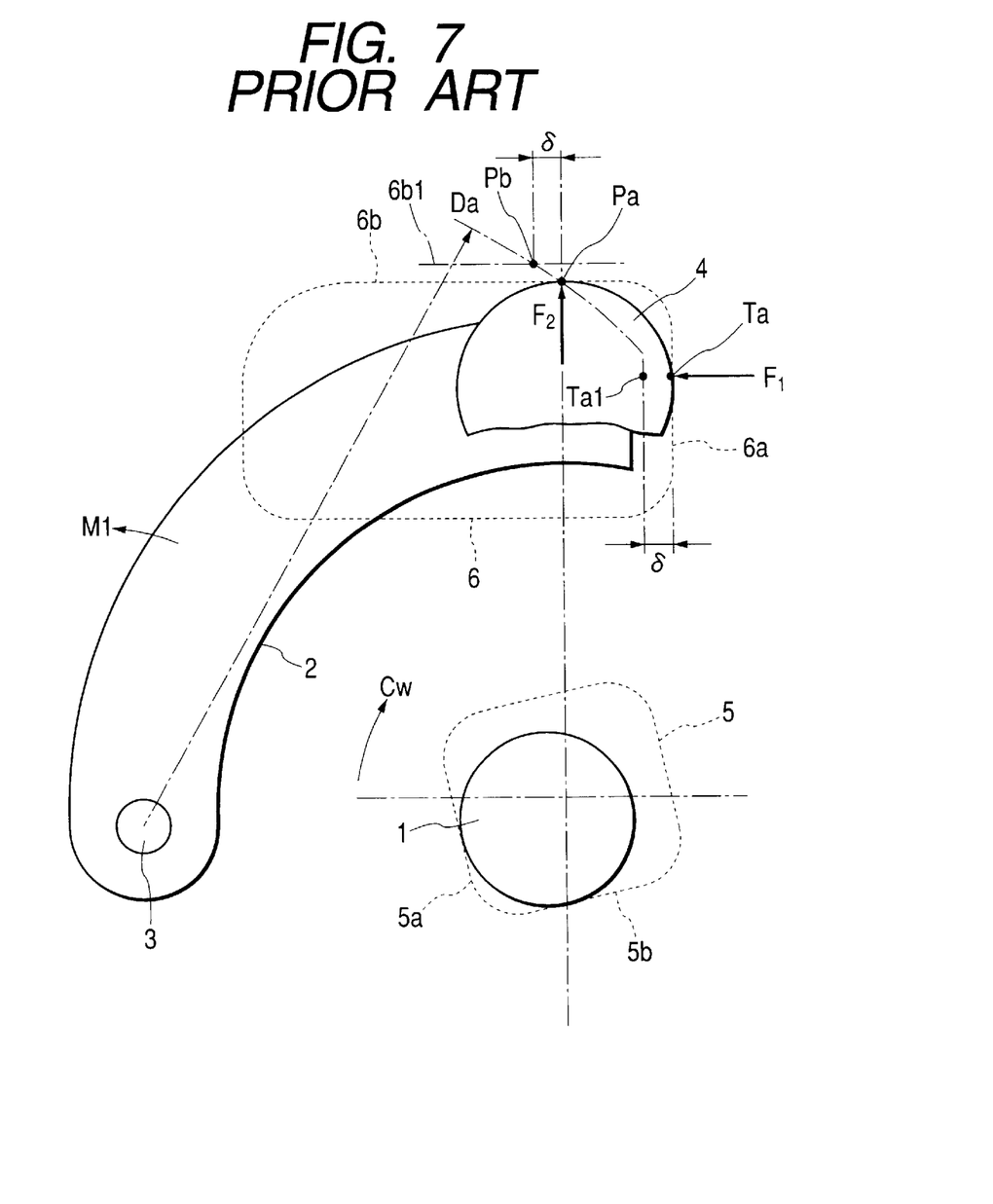
FIG. 7 is an enlarged plan view showing a conventional disk rotation driving apparatus and its problems.

FIG. 7 is an explanatory view showing positioning between a conventional disk rotation driving apparatus and a hub mounted thereto.

In a floppy disk, a metal hub is provided at the center of a flexible disk, and a rectangular center hole 5 and a driving hole 6 are bored in this hub.

A disk rotation driving apparatus for rotating and driving the disk is provided with a turn table, and the turn table is provided with a magnet for magnetically attracting the hub, a center shaft 1 projecting from the turn table, and a driving projection 4 projecting from the turn table at a position separate from the center shaft 1.

In FIG. 7, the driving projection 4 is formed at a tip of an arm 2, and a base of the arm 2 is rotatably supported to a shaft 3 provided at a position separate from the center shaft 1 on the turn table.

When a disk is loaded, the center shaft 1 of the turn table is inserted into the center hole 5 of the hub, and almost concurrently with this, the disk is held by a magnetic head. At the point of time when the turn table starts to rotate in a clockwise direction (CW), the turn table rotates in the clockwise direction earlier than the hub because of the frictional resistance between the disk and the magnetic head, and at this time, the driving projection 4 enters the driving hole 6 of the hub. Thereafter, although the hub, together with the turn table, is rotated in the clockwise direction, since the hub receives the frictional resistance, the driving projection 4 receives a pressing force F1 in a tangential direction by a side edge 6a of the driving hole 6.

The moment M1 in the counterclockwise direction is given to the arm 2 by this pressing force F1, and a force F2 toward the outside in a radius direction is given by this moment M1 from the driving projection 4 to an outer peripheral edge 6b of the driving hole 6. The hub is pressed upward in the drawing by the force F2, so that two side edges 5a and 5b of the center hole 5 of the hub are pressed to the center shaft 1, and in this state, positioning between the turn table and the hub is performed.

Besides, a motor for rotating the turn table is provided with, for example, a pulse generator for generating one index pulse per rotation, and when the turn table reaches a predetermined rotation position, the index pulse is generated. In a control part of the disk apparatus, a control is carried out to write a signal indicating a lead-in position in the disk, while a time when the index pulse is obtained is made a reference.

As shown in FIG. 7, since the turn table and the hub are rotated in the state where the relative position is determined, the index pulse is made the reference, so that the signal can be recorded at the same position of the loaded disk.

In the disk rotation driving apparatus shown in FIG. 7, if the relative position between the center hole 5 of the hub and the driving hole 6 is always uniform, it is possible to always determine the relative position between the turn table and the hub with high precision. However, there is fluctuation in the relative position between the center hole 5 and the driving hole 6 among the hubs, and there is also fluctuation in the size of the driving hole 6. When the hub having such fluctuation is mounted on the turn table shown in FIG. 7, the relative position between the turn table and the hub can not be made constant.

For example, as shown in FIG. 7, it is assumed that the outer edge part 6b of the driving hole 6 is shifted to a position denoted by symbol 6b1 toward the outer peripheral side relative to the center hole 5. At this time, since the arm 2 rotates with the shaft 3 as a fulcrum, a press contact point Pa between the driving projection 4 and the outer edge part 6b of the driving hole 6 is moved on an arc locus Da with the shaft 3 as the center, and the press contact point is moved to Pb. As a result, a contact point between the driving projection 4 and the side edge 6a of the driving hole 6 is shifted from Ta to Ta1 by a distance δ.

Thus, as compared with the normal positioning state, the hub is positioned on the turn table in a state where it is rotated in the counterclockwise direction by approximately δ. When the signal indicating the lead-in position is recorded on the disk with the index pulse as the reference, the lead-in position of this disk becomes different from the lead-in position of another disk, and the compatibility of the disks can not be kept.

SUMMARY OF THE INVENTION

The present invention solves the foregoing conventional problems, and has an object to provide a disk rotation driving apparatus in which even if there is a deviation in a relative position between a center hole of a hub and a driving hole, when a turn table and the hub are positioned, a shift of the hub in a rotation direction can be made minimum, or the shift can be eliminated.

According to the present invention, a disk rotation driving apparatus comprises a turn table on which a hub provided in a disk is placed, a center shaft projecting at a rotation center part of the turn table, a driving projection projecting from the turn table at a position separate from the center shaft, and a motor driving part for rotating and driving the turn table, and is characterized in that an arm including the driving projection at a tip and a rotatably supported base is provided on the turn table, the turn table is provided with a first guide part with which an outer edge part of the base of the arm comes in contact, and a second guide part which is positioned at an inner peripheral side relative to the first guide part and with which an inner edge part of the base of the arm comes in contact, and when a line connecting a center Od of the driving projection when the arm is at a predetermined rotation position and a center of the center shaft is made a reference normal R0, and an arc passing through the center Od of the driving projection and having a rotation center O of the arm as a center is denoted by D0, shapes of the first guide part and the outer edge part, and shapes of the second guide part and the inner edge part are determined so that when a moment in a direction in which the driving projection goes away from the center shaft is exerted on the arm, the center Od of the driving projection is moved to a side of the reference normal R0 rather than the arc D0.

For example, the shapes of the first guide part and the outer edge part, and the shapes of the second guide part and the inner edge part are such that when the moment in the direction in which the driving projection goes away from the center shaft is exerted on the arm, the rotation center O of the arm is moved toward an outer peripheral side of the reference normal R0.

Besides, the outer edge part of the arm has a convex curve shape directed toward an outer peripheral direction, or the first guide part has a convex curve shape directed toward an inner peripheral direction, and an angle between the first guide part and the second guide part is determined so that when the moment in the direction in which the driving projection goes away from the center shaft is exerted on the arm, a contact point A between the first guide part and the outer edge part is moved toward the outer peripheral side of the reference normal R0.

For example, the first guide part and the second guide part face each other such that an interval is gradually increased toward a downstream side in a rotation direction of the turn table.

Further, when the center shaft enters a center hole of the hub, and the driving projection enters a driving hole of the hub to rotate the turn table, a resistance torque generated by sliding between the first guide part and the outer edge part and sliding between the second guide part and the inner edge part is smaller than the moment given from the driving hole to the driving projection.

The present invention is contrived such that when the driving hole of the hub pushes the driving projection and the moment is exerted on the arm, the driving projection can be moved along the reference normal R0 to the utmost degree. Thus, even if there is a positional shift between the driving hole of the hub and the center hole, the hub and the turn table can make a relative positional shift in a rotation movement direction minimum.

DETAILED DESCRIPTION OF THE PREFERRED EMBODIMENTS

Figure 1:
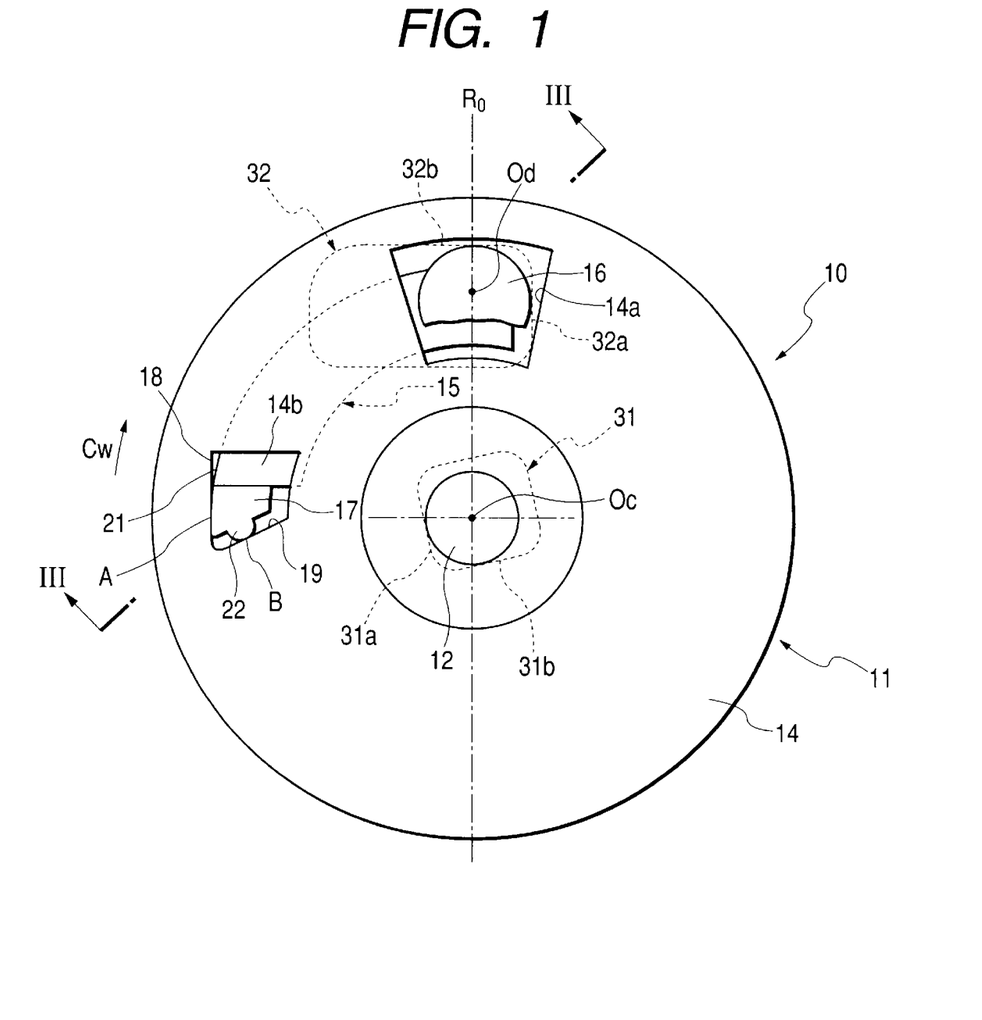
FIG. 1 is a plan view showing a disk rotation driving apparatus of the present invention.
Figure 2:
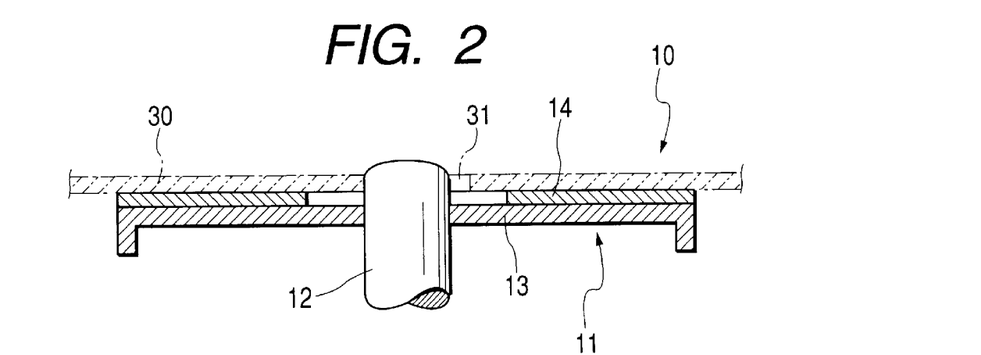
FIG. 2 is a sectional view taken along a center line of FIG. 1.
Figure 3:
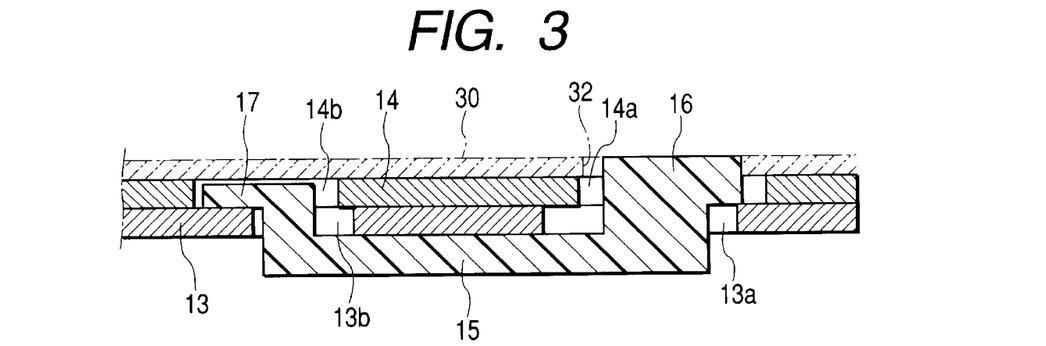
FIG. 3 is a sectional view taken along line III—III of FIG. 1.
Figure 4:
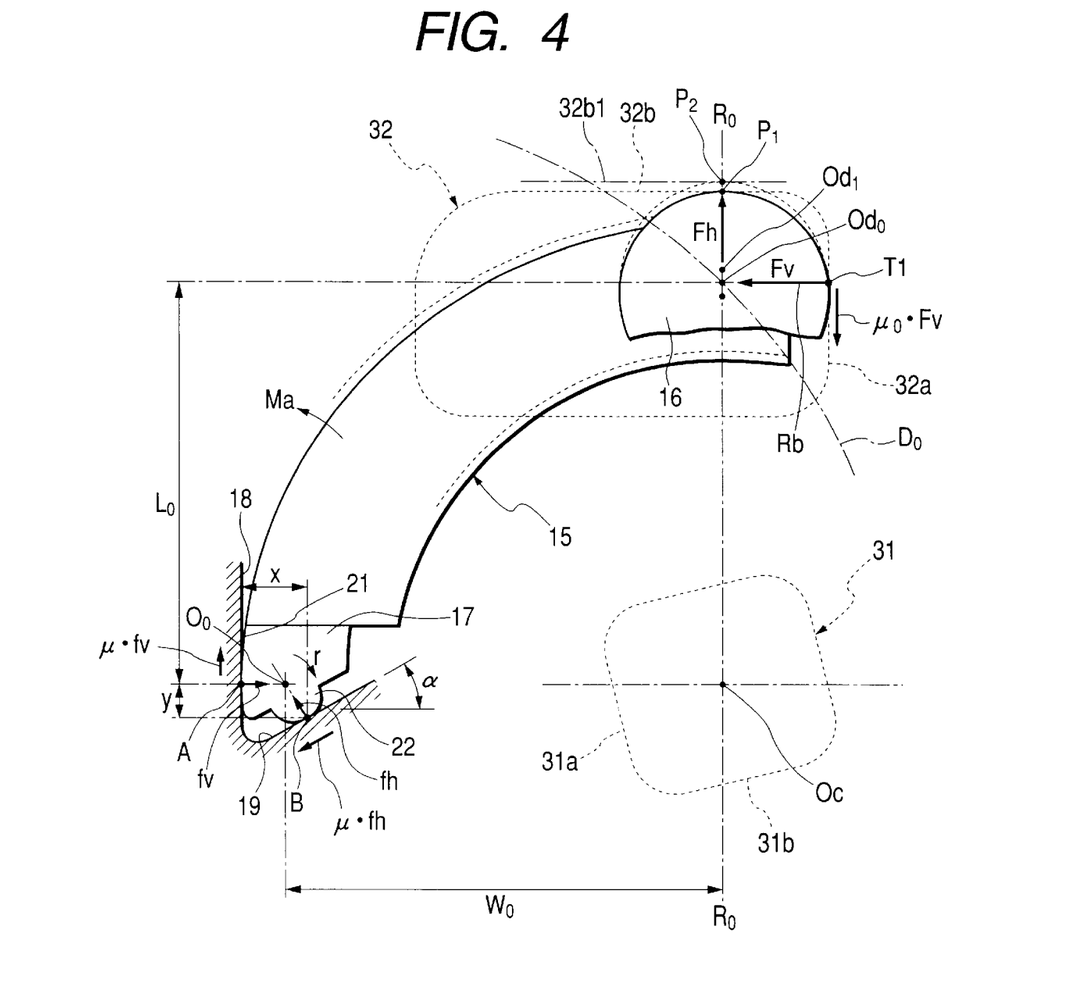
FIG. 4 is an enlarged plan view showing a shape of an arm and its support state.
Figure 5:
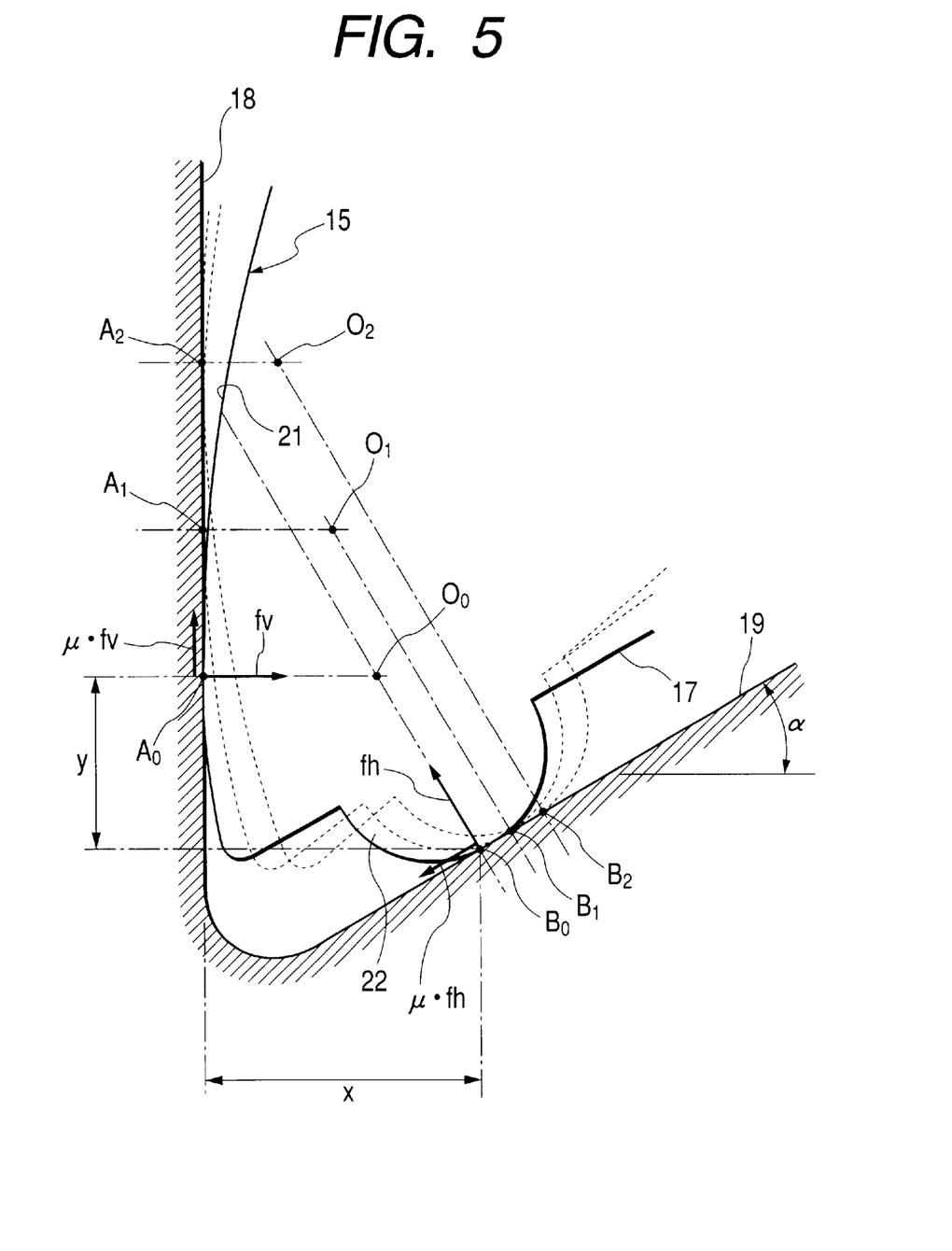
FIG. 5 is an enlarged plan view showing a support state of a base of the arm of FIG. 4.

FIG. 1 is a plan view showing a disk rotation driving apparatus of the invention, FIG. 2 is a sectional view along its center line, FIG. 3 is a sectional view along line III—III of FIG. 1, FIG. 4 is an enlarged view showing a support state of an arm, and FIG. 5 is an enlarged view showing a contact state between a base of the arm and a guide part and in which part of FIG. 4 is further enlarged.

This disk rotation driving apparatus 10 includes a circular turn table 11. The center part of the turn table 11 is fixed to a center shaft 12, and the center shaft 12 projects upward from the turn table 11. The center shaft 12 serves also as a rotation driving shaft, and the center shaft 12 is rotated and driven by a motor driving part. For example, in the motor driving part, a rotor coil is provided at a lower part of the center shaft 12, and a stator magnet faces the outer periphery of the rotor coil.

A pulse generator is provided in the motor driving part, and for example, one index pulse is obtained per rotation of the turn table 11.

The turn table 11 includes a support disk 13 made of a magnetic metal material, and an attachment disk 14 placed thereon. The whole or part of the attachment disk 14 includes a magnet, and a metal hub 30 can be attracted by magnetic attracting force of the attachment disk 14.

As shown in FIG. 3, holes 13a and 13b are formed in the support disk 13 at positions separate from the center shaft 12, and holes 14a and 14b are also formed in the attachment disk 14 positioned thereon.

An arm 15 is provided in the turn table 11. This arm 15 is made of synthetic resin or the like, a driving projection 16 projecting upward is integrally formed at its tip, and a rotation reference part 17 is integrally formed at a base. The arm 15 is positioned under the support disk 13, the driving projection 16 extends upward through the hole 13a of the support disk 13 and the hole 14a of the attachment disk 14, and the driving projection 16 is projected upward from the surface of the attachment disk 14.

The rotation reference part 17 extends upward through the hole 13b formed in the support disk 13, and is placed on the support disk 13 in the hole 14b of the attachment disk 14. Thus, the hole 14b of the attachment disk 14 is a support part for rotatably supporting the base of the arm 15.

As shown in FIG. 1, two inner surfaces of the hole 14b of the attachment disk are a first guide part 18 and a second guide part 19. The first guide part 18 is positioned at an outer peripheral side and is formed to be linear, and the second guide part 19 is also formed to be linear. The second guide part 19 is formed at an inner peripheral side of the first guide part 18 to have a predetermined opening angle with respect to the first guide part 18. The first guide part 18 and the second guide part 19 are taper-shaped so that the opposed interval gradually becomes wide toward the downstream side of a rotation direction (CW) of the turn table.

As shown in FIGS. 4 and 5, in the rotation reference part 17 of the base of the arm 15, an outer edge part 21 positioned at the outer peripheral side is a convex curve shape directed toward the outer peripheral direction, and in this embodiment, it has an arc shape of a large radius of curvature. The radius of curvature is almost equal to the length of a perpendicular line extending from the center Oc of the center shaft 12 to the first guide part 18. Besides, in the rotation reference part 17, a projection 22 of a small arc shape is formed at an inner edge part positioned at an inner peripheral side. Then, the first guide part 18 and the outer edge part 21 are in contact with each other at a contact point A, and the projection 22 and the second guide part 19 are also in contact with each other at a contact point B. Thus, the arm 15 can be freely rotated slightly in the clockwise direction and the counter clockwise direction with the side of the rotation reference part 17 as the center. At the time of the rotation, the contact point A and the contact point B are moved, and as a result, the rotation center of the arm is also always moved.

The metal hub 30 is provided at the center of the flexible disk such as a floppy disk, and as shown in FIG. 1, a rectangular center hole 31 is bored in the center of the hub 30, and two positioning edges 31a and 31b are provided in the center hole 31. A driving hole 32 is bored at a position separate from the center hole 31 of the hub 30. A side edge 32a of the driving hole 32 positioned at the downstream side in the rotation direction and an outer peripheral edge 32b form a positioning part coming in contact with the driving projection 16.

FIG. 4 shows a state in which the hub 30 having the center hole 31 and the driving hole 32 adapted for a standard is positioned at the center shaft 12 and the driving projection 16. When the center of a cylindrical shape of the driving projection 16 in this state is denoted by Od0, a line connecting the center Oc of the center shaft 12 and the center Od0 of the driving projection 16 is made a reference normal R0. At this time, the first guide part 18 is parallel to the reference normal R0.

Next, a positioning operation of the hub in the disk rotation driving apparatus will be described.

When a floppy disk or the like is loaded in the disk rotation driving part, the center shaft 12 of the turn table 11 is inserted in the center hole 31 of the hub 30 provided at the center of the disk, and almost currently with this, the disk is held by a magnetic head.

At the point of time when the turn table 11 starts to rotate in the clockwise direction (CW), since resistance is given to the hub 30 by friction between the disk and the magnetic head, the turn table 11 rotates in the clockwise direction earlier than the hub 30, and at this time, the driving projection 16 enters the driving hole 32 of the hub 30.

When the turn table 11 is further rotated in the clockwise direction, since the hub 30 receives the frictional resistance, the driving projection 16 is pressed to the side edge 32a of the driving hole 32. In FIG. 4, a reaction force in the tangential direction of the disk, exerted on the center Od0 of the driving projection 16 from the side edge 32a is expressed by a pressing force Fv.

By the pressing force Fv in the tangential direction, a moment Ma with the rotation reference part 17 as the rotation center and in the counterclockwise direction is exerted on the arm 15. By this moment Ma, the driving projection 16 gives an outward pressing force Fh in the radial direction to the outer peripheral edge 32b of the driving hole 32. The outer peripheral edge 32b of the driving hole 32 is pressed outward in the radial direction by the pressing force Fh, so that the two positioning edges 31a and 31b of the center hole 31 of the hub 30 are pressed to the center shaft 12, and the turn table 11 and the hub 30 are positioned.

Although the hub 30 is manufactured by press molding or the like, there is a definite tolerance in the molding size of the hub for each floppy disk, and as a result, there is fluctuation in the relative position between the center hole 31 and the driving hole 32, and there is also fluctuation in the size of the driving hole 32. FIG. 4 shows a case where the position of the outer peripheral edge 32b of the driving hole 32 is shifted to the outer peripheral side, and is formed at a position 32b1. At this time, by the moment Ma, the arm 15 is slightly rotated in the counterclockwise direction until the driving projection 16 strikes against the outer edge part at the position 32b1.

Since this embodiment is structured such that the contact points between the rotation reference part 17 of the arm 15 and the first guide part 18 and between that and the second guide part 19 are changed in accordance with the rotation position of the arm 15, when the arm 15 is rotated in the counterclockwise direction, contact point T1 between the side edge 32a of the driving hole 32 and the driving projection 16 is not extremely moved in the counterclockwise direction.

FIG. 5 shows contact relations, when the arm 15 is rotated, between the rotation reference part 17 and the first guide part 18 and between that and the second guide part 19. FIG. 5 stepwise shows a state in which the arm 15 is gradually rotated in the counterclockwise direction from the position of a solid line.

When the arm 15 is at the rotation position of the solid line, the contact point between the outer edge part 21 of the rotation reference part 17 and the first guide part 18 is A0, and the contact point between the projection 22 of the inner edge part and the second guide part 19 is B0. The rotation center of the arm 15 at this instant is O0, and this is positioned at an intersection between a perpendicular line from the first guide part 18 with the contact point A0 as the starting point and a perpendicular line from the second guide part 19 with the contact part B0 as the starting point.

When the arm 15 in the state of the solid line is rotated in the counterclockwise direction, since the rotation reference part 17 is rotated in the space surrounded by the first guide part 18 and the second guide part 19, the contact point between the outer edge part 21 and the first guide part 18 is moved from A0 to A1 and A2, and the contact point between the projection 22 and the second guide part 19 is moved from B0 to B1 and B2. As a result, the rotation center of the arm 15 at each time is moved from O0 to O1 and O2.

As described above, when the arm 15 is rotated in the counterclockwise direction, the contact point A between the outer edge part 21 of the rotation reference part 17 of the arm 15 and the first guide part 18 is moved along the first guide part 18 parallel to the reference normal R0 toward the outer peripheral direction of the disk, and the rotation center O of the arm 15 is also moved along the first guide part 18 toward the outer peripheral direction of the disk. Thus, when the arm 15 is rotated in the counterclockwise direction, as shown in FIG. 4, the center of the driving projection 16 does not deviate from the reference normal R0 largely as indicated by Od0 to Od1, and is moved toward the outer peripheral direction.

Thus, in FIG. 4, when the center of the driving projection 16 at the time when the arm 15 is in the state of the solid line is denoted by Od0, and an arc passing through the center Od0 of the driving projection 16 with the rotation center O0 of the arm 15 at this instant as the center is denoted by D0, when the arm 15 is rotated in the counterclockwise direction from this state, the center Od of the driving projection 16 is moved at least outside of the arc DO and toward the outer peripheral direction along the reference normal R0.

Accordingly, as shown in FIG. 4, even if the outer peripheral edge 32b of the driving hole 32 is formed at the position 32b1 because of the tolerance of parts or the like, and as a result, the arm 15 is rotated in the counterclockwise direction from a regular position, the center of the driving projection 16 does not deviate largely from the reference normal R0. That is, even if the press contact point between the driving projection 16 and the outer peripheral edge 32b is changed from P1 to P2, the press contact point P2 does not deviate largely from the reference normal R0, and accordingly, the contact point T1 between the side edge 32a of the driving hole 32 and the driving projection 16 does not shift largely, and the positions of the hub 30 and the turn table 11 do not shift largely in the rotation direction.

Besides, when the directions of the first guide part 18 and the second guide part 19, and the radius of curvature of the arc of the outer edge part 21 are suitably set, it is also possible that when the arm 15 is rotated, the center Od of the driving projection 16 can also be always moved on the reference normal R0.

In the driving apparatus of the floppy disk or the like, at the timing of the index pulse obtained from the pulse generator provided in the motor driving part, the signal indicating the lead-in position is written in the disk. In the disk rotation driving apparatus, even if the relative position between the center hole 31 of the hub 30 and the outer peripheral edge 32b of the driving hole 32 is changed, since the position shift of the hub 30 in the rotation direction with respect to the turn table 11 is small, or the position shift can be almost eliminated, even when the hub 30 with any size is loaded, it becomes possible to always write the signal to the disk at an approximate position or the same position, and the compatibility of the disk can be secured.

Next, in the disk rotation driving apparatus, conditions under which the hub 30 can be certainly positioned by the operation of the arm 15 will be described.

The center Od0 of the driving projection 16 is in the state where it is indicated by the solid line in FIG. 4, the rotation center of the arm 15 at that instant is denoted by O0, and the distances between the center Od0 and the rotation center O0 on the rectangular coordinates are respectively denoted by W0 and L0. When a pressing force given from the side edge 32a of the driving hole 32 to the center Od0 of the driving projection 16 is denoted by Fv, when frictional coefficient is denoted by $\mu 0$, a frictional reaction force exerted on the contact point T1 between the side edge 32a of the driving hole 32 and the driving projection 16 is $\mu 0 \cdot Fv$. Besides, a pressing force given from the center Od0 of the driving projection 16 to the outer peripheral edge 32b of the driving hole 32 is denoted by Fh, and a frictional resistance torque between the rotation reference part 17 of the base of the arm 15, and the first guide part 18 and the second guide part 19 is denoted by r.

At this time, if an inequality of the following numerical expression 1 is established, the positioning edges 31a and 31b of the center hole 31 can be pressed to the center shaft 12 by the pressing force Fh, and the hub 30 can be positioned on the turn table 11. Here, Rd denotes a radius of the cylindrical shape of the driving projection 16.

$$W0 \cdot Fh > \mu 0 \cdot Fv(Wo+Rd)+r \quad \text{[Numerical expression 1]}$$

Incidentally, as shown in FIGS. 4 and 5, when a pressing reaction force exerted on the contact point A between the outer edge part 21 of the rotation reference part 17 of the base end part of the arm 15 and the first guide part 18 is denoted by fv, its frictional force is denoted by $\mu \cdot fv$, a pressing reaction force exerted on the contact point B between the projection 22 of the inner peripheral edge and the second guide part 19 is denoted by fh, its frictional force is denoted by $\mu \cdot fh$ ($\mu$ denotes a coefficient of static friction), distances of the contact point A and the contact point B on the rectangular coordinates are respectively denoted by x and y, and an inclination angle of the second guide part 19 with respect to a perpendicular line of the first guide part 18 is denoted by $\alpha$, the frictional resistance torque r is expressed by the following numerical expression 2.

$$r=y \cdot \mu \cdot fh \cdot \cos \alpha - x \cdot fh \cdot \cos \alpha + x \cdot \mu \cdot fv + y \cdot fv \quad \text{[Numerical expression 2]}$$

The numerical expression 1 means that when the driving hole 32 presses the driving projection 16 in the counterclockwise direction, if the moment exerted on the arm 15 in the counterclockwise direction is larger than the frictional resistance force expressed by the numerical expression 2, the hub 30 can be positioned on the turn table 11.

Figure 6:
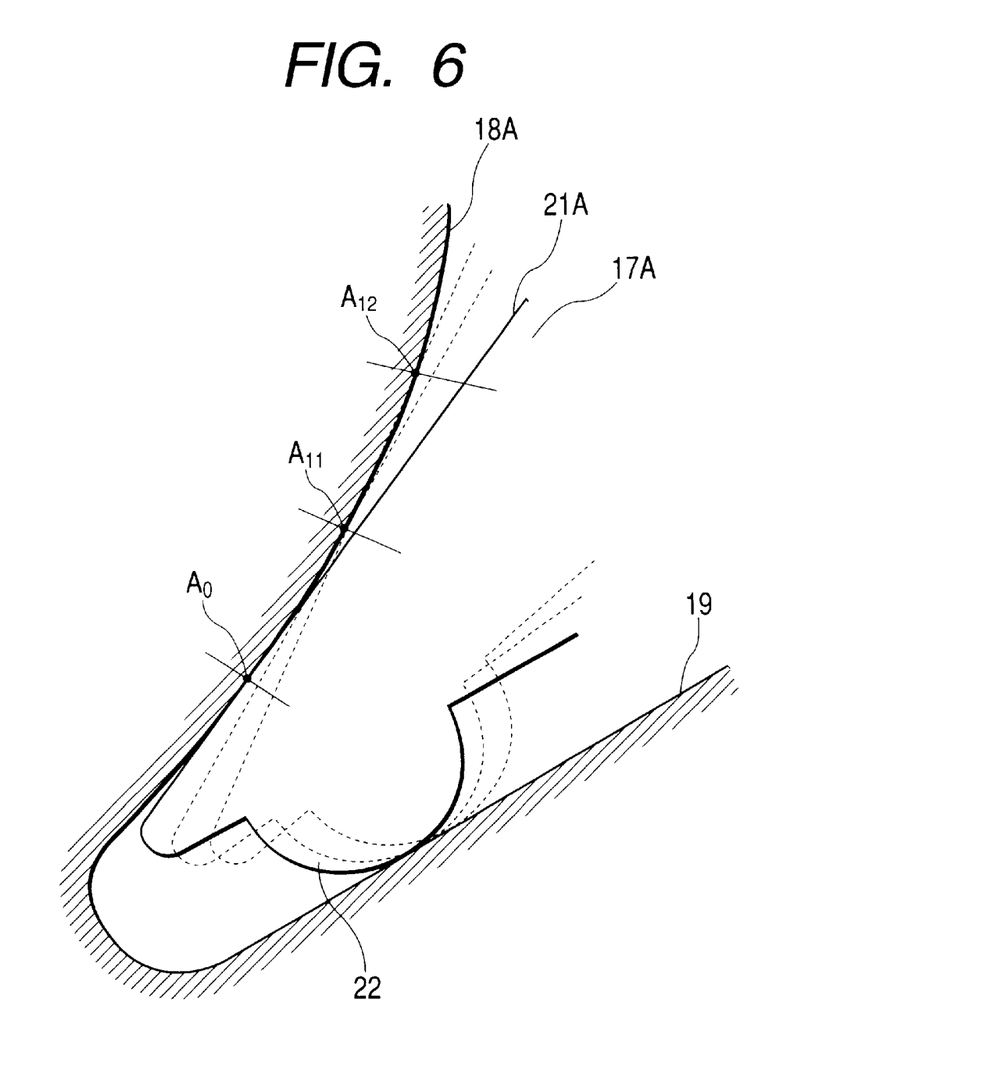
FIG. 6 is an enlarged plan view showing a second embodiment of the present invention and equivalent to FIG. 5.

FIG. 6 shows a second embodiment of the invention. In this embodiment, a first guide part 18A is a convex curve directed toward an inner peripheral direction, and has, for example, an arc shape. An outer edge part 21A of a rotation reference part 17A has a linear shape.

Even in such shapes, when the arm 15 is rotated in the counterclockwise direction, the contact point between the outer edge part 21A and the first guide part 18A can be moved along the reference normal R0 toward the outer peripheral direction as indicated by A0, A11 and A12, and accordingly, the rotation center of the arm can also be moved along the reference normal R0 as shown in FIG. 5. Thus, even if the position of the outer peripheral edge 32b of the driving hole 32 of the hub 30 is shifted, when the hub is positioned, a large position shift between the turn table 11 and the hub 30 in the rotation direction can be prevented.

As described above, according to the present invention, even if there is fluctuation in the position and shape of the driving hole formed in the hub, the hub can be always positioned at a uniform position on the turn table. Thus, it is possible to prevent the writing position of signals from fluctuating for each disk.

Besides, since a simple structure is adopted such that the driving projection is formed on the arm and the arm is supported on the turn table, the manufacturing cost of the disk rotation driving apparatus can also be reduced.

What is claimed is:

1. A disk rotation driving apparatus comprising a turn table on which a hub provided on a disk, a center shaft projecting at a rotation center part of the turn table, a driving projection projecting from the turn table at a position separate from the center shaft, and a motor driving part for rotating and driving the turn table, wherein:

an arm including the driving projection at a tip and a rotatably supported base is provided on the turn table, the turn table is provided with a first guide part with which an outer edge part of the base of the arm comes in contact, and a second guide part which is positioned at an inner peripheral side relative to the first guide part and with which an inner edge part of the base of the arm comes in contact, and when a line connecting a center Od of the driving projection when the arm is at a predetermined rotation position and a center of the center shaft is made a reference normal R0, and an arc passing through the center Od of the driving projection and having a rotation center O of the arm as a center is denoted by D0, shapes of the first guide part and the outer edge part, and shapes of the second guide part and the inner edge part are determined so that when a moment in a direction in which the driving projection goes away from the center shaft is exerted on the arm, the center Od of the driving projection is moved to a side of the reference normal R0 rather than the arc D0.

2. A disk rotation driving apparatus as set forth in claim 1, wherein the shapes of the first guide part and the outer edge part, and the shapes of the second guide part and the inner edge part are such that when the moment in the direction in which the driving projection goes away from the center shaft is exerted on the arm, the rotation center O of the arm is moved toward an outer peripheral side of the reference normal R0.

3. A disk rotation driving apparatus as set forth in claim 1, wherein one of the outer edge part of the arm has a convex curve shape directed toward an outer peripheral direction and the first guide part has a convex curve shape directed toward an inner peripheral direction, and an angle between the first guide part and the second guide part is determined so that when the moment in the direction in which the driving projection goes away from the center shaft is exerted on the arm, a contact point A between the first guide part and the outer edge part is moved toward an outer peripheral side of the reference normal R0.

4. A disk rotation driving apparatus as set forth in claim 1, wherein the first guide part and the second guide part face each other such that an interval is gradually increased toward a downstream side in a rotation direction of the turn table.

5. A disk rotation driving apparatus as set forth in claim 1, wherein when the center shaft enters a center hole of the hub, and the driving projection enters a driving hole of the hub to rotate the turn table, a resistance torque generated by sliding between the first guide part and the outer edge part and sliding between the second guide part and the inner edge part is smaller than the moment given from the driving hole to the driving projection.

* * * * *